US009087507B2

(12) United States Patent
Sengamedu

(10) Patent No.: US 9,087,507 B2
(45) Date of Patent: Jul. 21, 2015

(54) AURAL SKIMMING AND SCROLLING

(75) Inventor: Srinivasan H. Sengamedu, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 1661 days.

(21) Appl. No.: 11/600,346

(22) Filed: Nov. 15, 2006

(65) Prior Publication Data

US 2008/0086303 A1 Apr. 10, 2008

(30) Foreign Application Priority Data

Sep. 15, 2006 (IN) .......................... 2035/DEL/2006

(51) Int. Cl.

*G10L 13/00* (2006.01)
*G10L 13/08* (2013.01)
*G10L 21/00* (2013.01)
*G10L 25/00* (2013.01)
*G06F 17/00* (2006.01)
*G06F 17/20* (2006.01)
*G10L 13/027* (2013.01)

(52) U.S. Cl.

CPC ............... *G10L 13/00* (2013.01); *G10L 13/027* (2013.01); *G10L 13/08* (2013.01)

(58) Field of Classification Search

CPC ....... G10L 13/00; G10L 13/04; G10L 13/043; G10L 13/047; G10L 13/08; G10L 13/027
USPC ................................................. 704/232, 258
See application file for complete search history.

(56) References Cited

U.S. PATENT DOCUMENTS 3,704,345 A * 11/1972 Coker et al. .................. 704/266
5,555,343 A * 9/1996 Luther .......................... 704/260
5,572,625 A * 11/1996 Raman et al. ................. 704/260
5,752,228 A * 5/1998 Yumura et al. ................ 704/260
5,850,629 A * 12/1998 Holm et al. ................... 704/260
5,860,064 A * 1/1999 Henton ......................... 704/260

(Continued)

FOREIGN PATENT DOCUMENTS

WO WO 02/11120 * 2/2002 .............. G10L 13/08

OTHER PUBLICATIONS

"Shallow Semantic Parsing" The Stanford National Language Processing Group downloaded from the Internet Jul. 31, 2014 <https://web.archive.org/web20051027090252/http://nip.standford.edu/projects/shallow-parsing.shtml > dated Oct. 27, 2005 (1 page).

(Continued)

*Primary Examiner* — Matthew Baker
(74) *Attorney, Agent, or Firm* — Hickman Palermo Becker Bingham LLP

(57) ABSTRACT

Computer-based skimming and scrolling of aurally presented information is described. Different levels of skimming are achieved in aural presentations with allowing a user to navigate an aural presentation according to significant points identified within an information source. The significant points are identified using various indicia that suggest logical arrangements for the information contained within the source, such as semantics, syntax, typography, formatting, named entities, and markup tags. The identified significant points signal changes in playback mode for the audio presentation, such as different tones, pitches, volumes, or voices. Similar indicia may be used to generate identifying markers from the information source that can be aurally presented in lieu of the information source itself to allow for aural scrolling of the information.

32 Claims, 9 Drawing Sheets

(56) References Cited

U.S. PATENT DOCUMENTS

| | | | | |
|---|---|---|---|---|
| 5,884,266 | A * | 3/1999 | Dvorak | 704/270.1 |
| 5,893,132 | A * | 4/1999 | Huffman et al. | 715/201 |
| 5,899,975 | A * | 5/1999 | Nielsen | 704/270.1 |
| 6,052,663 | A * | 4/2000 | Kurzweil et al. | 704/260 |
| 6,088,675 | A * | 7/2000 | MacKenty et al. | 704/270 |
| 6,400,806 | B1 * | 6/2002 | Uppaluru | 379/88.02 |
| 6,446,040 | B1 * | 9/2002 | Socher et al. | 704/260 |
| 6,636,831 | B1 * | 10/2003 | Profit et al. | 704/275 |
| 6,708,152 | B2 * | 3/2004 | Kivimaki | 704/260 |
| 6,718,308 | B1 * | 4/2004 | Nolting | 704/275 |
| 6,907,397 | B2 * | 6/2005 | Kryze et al. | 704/251 |
| 6,985,864 | B2 * | 1/2006 | Nagao | 704/260 |
| 7,020,609 | B2 * | 3/2006 | Thrift et al. | 704/270.1 |
| 7,043,479 | B2 * | 5/2006 | Ireton | 1/1 |
| 7,174,509 | B2 * | 2/2007 | Sakai et al. | 715/201 |
| 7,191,131 | B1 * | 3/2007 | Nagao | 704/258 |
| 7,194,411 | B2 * | 3/2007 | Slotznick et al. | 704/271 |
| 7,240,006 | B1 * | 7/2007 | Brocious et al. | 704/270 |
| 7,251,604 | B1 * | 7/2007 | Thenthiruperai | 704/270.1 |
| 7,308,484 | B1 * | 12/2007 | Dodrill et al. | 709/218 |
| 7,313,525 | B1 * | 12/2007 | Packingham et al. | 704/270 |
| 7,788,100 | B2 * | 8/2010 | Slotznick et al. | 704/270.1 |
| 7,966,184 | B2 * | 6/2011 | O'Conor et al. | 704/260 |
| 8,014,542 | B2 * | 9/2011 | Chen et al. | 381/110 |
| 2002/0095294 | A1 * | 7/2002 | Korfin et al. | 704/275 |
| 2002/0178007 | A1 * | 11/2002 | Slotznick et al. | 704/270.1 |
| 2002/0198720 | A1 * | 12/2002 | Takagi et al. | 704/270.1 |
| 2003/0023427 | A1 * | 1/2003 | Cassin et al. | 704/201 |
| 2003/0132953 | A1 * | 7/2003 | Johnson et al. | 345/716 |
| 2004/0059577 | A1 * | 3/2004 | Pickering | 704/260 |
| 2004/0113908 | A1 * | 6/2004 | Galanes et al. | 345/418 |
| 2004/0218451 | A1 * | 11/2004 | Said et al. | 365/222 |
| 2005/0101355 | A1 * | 5/2005 | Hon et al. | 455/563 |
| 2006/0026000 | A1 * | 2/2006 | Bodin et al. | 704/270.1 |
| 2006/0031581 | A1 * | 2/2006 | Vriesema | 709/246 |
| 2006/0080310 | A1 * | 4/2006 | Gordon et al. | 707/4 |
| 2006/0106618 | A1 * | 5/2006 | Racovolis et al. | 704/277 |
| 2006/0115799 | A1 * | 6/2006 | Stephen et al. | 434/185 |
| 2006/0150075 | A1 * | 7/2006 | Dietl et al. | 715/501.1 |
| 2006/0206339 | A1 * | 9/2006 | Silvera et al. | 704/278 |
| 2006/0206340 | A1 * | 9/2006 | Silvera et al. | 704/278 |
| 2007/0106646 | A1 * | 5/2007 | Stern et al. | 707/3 |
| 2007/0106941 | A1 * | 5/2007 | Chen et al. | 715/728 |
| 2007/0208687 | A1 * | 9/2007 | O'Conor et al. | 707/1 |
| 2009/0076821 | A1 * | 3/2009 | Brenner et al. | 704/260 |
| 2011/0231192 | A1 * | 9/2011 | O'Conor et al. | 704/260 |

OTHER PUBLICATIONS

"Voice Extensible Markup Language (VoiceXML) Version 2.0" downloaded from the Internet Jul. 31, 2014 <https://web.archive.org/web/20011110111724/http://www.w3.org/TR/voicexml20/ dated Nov. 10, 2001 (124 pages, submitted in two parts).

* cited by examiner

AURAL SKIMMING FLOW DIAGRAM

AURAL SCROLLING FLOW DIAGRAM

Structurally rich HTML page

Content-rich HTML page

AURAL SKIMMING AND SCROLLING

RELATED APPLICATION

This Application claims the benefit under 35 U.S.C. §119 of the India Patent Application No. 2035/DEL/2006, filed on Sep. 15, 2006 by Srinivasan Sengamedu entitled AURAL SKIMMING AND SCROLLING, which is incorporated herein by reference.

TECHNOLOGY

The present invention relates generally to aurally presenting information. More particularly, embodiments of the present invention relate to skimming and scrolling through an aural information source.

BACKGROUND

The aural assimilation of information is useful in ways that visual assimilation of information may not. Thus, speech interfaces now facilitate aural presentations of information in a variety of environments, including computer-based screen readers, portable electronic devices, and phone-based information systems. Speech interfaces are a great aid in freeing visual attention in cognitively overloaded environments. Reading out a file, mail, or web page while composing a document, replying to a mail, doing exercises, etc. enables multitasking by freeing the visual attention. Speech interfaces are also an effective way of promoting folk computing. The terms “aural” and “auditory,” applied for instance in the phrases “aural skimming and/or scrolling” and “auditory skimming and/or scrolling,” are used interchangeably herein, unless expressly noted otherwise.

With the availability of portable devices like PDAs, mobile phones, and iPods, speech interfaces are likely to witness increased use. Today’s speech interfaces may comprise both speech input and speech output. Speech input is handled through speech recognition and speech output through speech synthesis. The inputs to streaming speech applications need not necessarily be speech but can be any input interface, including keyboard, keypad, media player control, optical recognizer, and so on. Potential applications of speech synthesis include email readers, RSS to Podcast conversions, news readers, and so on.

One challenge to the more widespread proliferation of devices that deliver information aurally is the sequential nature of aural presentations. This sequential nature makes it much harder to skip predictable information and locate specific information within an aural presentation than within a visual presentation. For instance, suppose a user wanted to convert the following example email to speech:

```
From: John <john@domain1.com>
To: Sue <sue@domain2.com>, Joe <joe.domain3.com>
Cc: chae@domain4.com
Subject: Re: Annual day
> Please send 10 iPods.
Please mention the model number.
```

If this email were visually assimilated by Sue, for example, she would hardly read the more or less routine and/or predictable information like “john@domain1.com.” Instead, she would visually skim over most of the message. The format of text provides cues to her so that she recognizes which parts of the text are important. First, the text is divided into sentences and lines, giving Sue a hierarchical structure with which to process the message. Second, the start of each line contains an identifying marker such as “From” or “>” to help Sue quickly recognize the context of the line. If Sue were reading this message to determine what John’s response is, she would use these cues to skip straight to the first line that appears to be John’s response: “Please mention the model number.” If she were to read the response and not remember what the response was in reply to, she might then scan backwards in the message to the line marked with a “>” character, or perhaps even to the line marked “Subject.” If the email were longer, for instance seven pages, she might find it easier to search for the information she needs by scanning the topic sentence of each paragraph or looking for certain keywords and numbers.

On the other hand, if this email were assimilated aurally through a speech synthesizer, all of its parts would be given equal importance. Sue would have no choice but to listen to the whole message to find the information she was seeking. If she missed important information the first time, she would, just like a person who missed a phone number left in a voicemail message, have to listen to the aural presentation all over again.

Computer interfaces support another feature that facilitates more efficient assimilation of a visual information source—scrolling. Scrolling may be defined as producing faster output which closely corresponds to the original information. Scrolling helps facilitate even more efficient skimming. For example, if an individual were looking for a small section of a very long document, the individual could use a computer-based application to visually scroll through the document with keys on a keyboard or the scroll wheel of a mouse. The document would rapidly progress before the individual’s eyes, allowing the individual to look for key headers, words, bolded text, or other formatting that might help the individual locate the section that the individual is searching for. In this respect, scrolling works much like searching for a scene in movie using fast forward and rewind buttons. Unfortunately, aurally presented information cannot be scrolled in this fashion, since, in contrast to visually presented information, aurally presented information cannot be comprehended in traditional “fast forward” and “rewind” modes.

Of course, there are many simple approaches to progressing through aurally presented content without having to listen to the entire aural presentation. For instance, a device might allow a user to skip forwards or backward a predetermined amount of time into a presentation. A device might also allow a user to skip to predetermined segments, tracks, or files. However, these approaches have their drawbacks in that unless someone has already identified for the user exactly where in the presentation the user can expect to find the information the user is looking for, there is no way for the user to know whether a particular segment is relevant or should be skipped. The user must actually listen to the whole segment. Thus, neither of these approaches can match the efficiency of the above described context-driven scrolling and skimming methods employed by typical persons assimilating visual information.

Another approach may be to segment a presentation based on acoustic cues such as pause and pitch. This approach provides some context, but fails to provide the same level of logical context that can be gleaned in visually presented information from cues such as headers, text formatting, punctuation, key words, and other afore-mentioned markers.

Another approach may be to translate the speech to text and allow the user to skim through the textual transcript. Once the user identifies the portion of the textual transcript the user wants to hear, the user may begin listening to the corresponding portion of the aural presentation. Because this approach is insensitive to the context of the information in the transcript, however, the user must actually read the transcript and search for the desired information. Thus, the user is deprived of the ability to assimilate the information aurally without requiring visual attention, or to assimilate the information aurally with minimal visual attention. This approach also has the drawback of requiring a device that contains a screen large enough for viewing a transcript.

Another approach to producing a faster output of an information source may be to time-compress the audio stream using signal processing techniques. Using such an approach, an audio presentation is sped up so that a voice appears to be speaking at a faster rate, thus creating a different playback speed. However, such an approach is limited in that speech comprehension rapidly degrades the faster a message is sped up.

Another approach may be to develop a rule-based system for scrolling and skimming an aural presentation. Unfortunately, skimming and scrolling a visual information source are complex phenomena involving higher-level cognitive processes. While possible to mimic these cognitive operations through a rule-based system for aural presentations, such a system would be enormously complex and not likely to reflect the needs and objectives of most listeners.

Another approach to producing a faster output of an information source may be summarization. However, with existing summarization processes it is difficult to establish a sequential correspondence between the original information and the summary. For example, a summary may contain juxtaposition of concepts in the original information, or altogether neglect minor facts that may be of interest to a researcher. Thus, summarization does not provide an aural scrolling effect similar to visual scrolling.

Based on the foregoing, a mechanism to overcome the lack of context-sensitive skimming and scrolling in aural presentations of information would be useful. Such a mechanism could make it easier for users to locate and comprehend specific information in an aural presentation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Computer-based skimming and scrolling of aurally presented information is disclosed. According to one embodiment, an aurally presented information source is skimmed by a computer or like device. One or more characteristics of the information source are analyzed to identify a set of significant points within the information source. Metadata such as location data is stored that identifies the location of the significant points. Upon receiving a user input, the location data is inspected to identify a particular significant point within the information source. An aural presentation of the information source is initiated at the location of the particular significant point.

According to one embodiment, different playback modes are used to identify the significance of various portions of the aural presentation. One or more characteristics of the information source are analyzed to identify a set of significant points within the information source. Location data is stored that identifies the location of the significant points. During an aural presentation of the information source in a first playback mode, the location data is used to determine that a current playback location matches a particular significant point. In response to detecting that the current playback location matches the particular significant point, the aural presentation is changed from the first playback mode to a second playback mode.

According to one embodiment, aurally presented information is scrolled by a computer or like device. One or more characteristics of the information source are analyzed to generate a set of identifying markers associated with locations within the information source. Location data are stored that identifies locations within the information source associated with the identifying markers. While aurally presenting a particular identifying marker, input is received. In response to the input, the location data is inspected to identify a particular location within the information source. An aural presentation of the information source is initiated at the location of the particular significant point.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
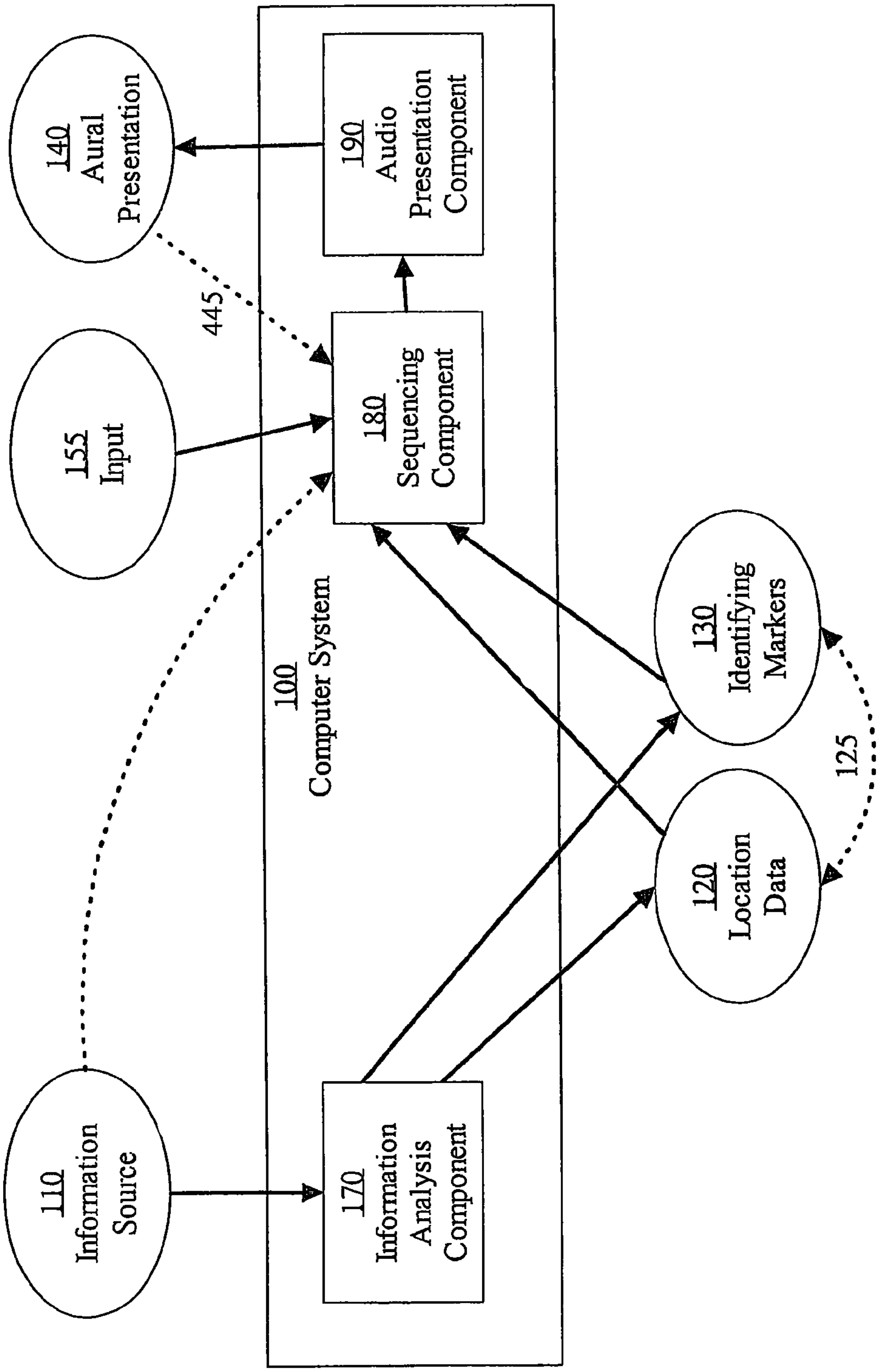
FIG. 1A depicts the operation of an example system in which an embodiment of the invention may be practiced.

Embodiments are described that relate to aural skimming and scrolling. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Embodiments of the present invention relate to aural skimming and scrolling. Context-sensitive skimming and scrolling of aurally presented information is achieved in one embodiment with analyzing various characteristics of an information source that suggest logical arrangements of the information contained within the source (e.g. paragraph divisions, formatting, and headings). According to one embodiment, the analysis of these characteristics is used to identify logically significant points within the information source. Once the logically significant points have been identified, location data that identifies the location of the points within the information source is stored external to the information source. An aural presentation of the information source is navigated according to this location data, thus achieving a skimming effect. For example, "Forward" and "Backwards" commands may be used to initiate an aural presentation of information beginning at the next or previous significant point in a currently playing aural presentation.

Therefore, information in an aural information source may more efficiently be assimilated. Embodiments of the present invention provide a mechanism to overcome the conventional lack of context-sensitive skimming and scrolling in aural presentations of information and thus make it easier for users to locate and comprehend specific information in an aural presentation. The terms "aural" and "auditory," applied for instance in the phrases "aural skimming and/or scrolling" and "auditory skimming and/or scrolling," are used interchangeably herein, unless expressly noted otherwise.

In one embodiment, metadata is stored for each significant point identified in the location data. The metadata for each significant point may indicate the significance of the significant point within the information source. For example, the metadata associated with a significant point may indicate that the significant point is the start of a new section, a new paragraph, or a quote. Absolute commands, such as "Go to the third Section" or "Go to Message Body," may be used to navigate the aural presentation based on this metadata. Sets of significant points that share similar metadata may also be navigated separately from other significant points. For example, the relative command "Next Paragraph" may navigate to the next significant point for which there exists metadata indicating a new paragraph.

In one embodiment, the aural presentation of the information source may be presented according to different playback modes. Playback modes may be formed by altering the speed, pitch, tone, volume, or vocal characteristics of the aural presentation. The playback mode of the aural presentation may be changed when the current playback location matches a significant point with a particular significance. For example, the aural presentation may change to a louder playback mode when it arrives at a significant point indicating bold text in the information source. In one embodiment of the invention, a "blank" playback mode may be used to essentially skip to another significant point so as to avoid presentation of segments of the information source deemed insignificant to the listener. For example, it may be desirable to skip sidebars or advertisements in a web page.

According to one embodiment of the invention, the analysis of these characteristics of the information source is used to generate "identifying markers" associated with locations within the information source. An identifying marker may be, for example, excerpts from the information source, such as keywords or phrases, summarizations of segments of the information source, or descriptions of the significance of various segments of the information source (e.g. "heading" or "message body").

The identifying markers are aurally presented. A user may scroll through segments of the information source by listening to an aural presentation of the identifying markers generated for the information source, as opposed to listening to the original information source. Thus, a faster output of the information is presented which still correlates closely to the information source. At any point, the listener may stop the presentation of identifying markers and resume the normal presentation of the information source at a point logically related to the last presented identifying marker. In such manner, the listener may quickly locate a specific section of the presentation to which the listener wishes to listen.

In some embodiments, the availability of an underlying textual representation of the information is exploited to provide context-sensitive skimming and scrolling of an aurally presented information source. Just as the way a text is organized and presented influences the visual skimming experience, the organization of a textual representation of an aurally presented information source suggests how the information may be aurally skimmed. For example, well-written and well-presented text improves skimming through the use of sections, headings, emphasized text, underlined text, highlighting, and so on. Furthermore, computer-based processing of the textual representation, such as grammar tagging and shallow parsing, helps identify how a human cognitively structures the presented information.

In one embodiment, the information source is entirely text-based, such as a web page or word processing document. A text-to-speech engine may be used to convert the text-based information into an aural presentation.

In one embodiment, the textual representation may be time-correlated to an aural information source, such as a closed-captioned television program or subtitled movie. The suggested significant points and identifying markers derived from the textual representation are mapped to segments of the aural presentation, and the aural presentation is navigated accordingly.

In other embodiments, similar characteristics are analyzed in non-textual representations of the information, such as pre-recorded speech. In one embodiment, pre-recorded speech is first converted to a textual representation using a speech-to-text engine, and then analyzed as discussed above. In one embodiment, the speech is analyzed directly.

Example System

FIG. 1A depicts the operation of a computer system 100 in which an embodiment of the invention may be practiced. Computer system 100 may be a self-contained device, such as a desktop computer, laptop, personal digital assistant, or digital music player, or a distributed system such as multiple devices on a computer or telephone-based network. Further description of computer systems capable of implementing an embodiment of the invention shall be described hereafter.

An information analysis component 170 disposed within computer system 100 analyzes information source 110 for various characteristics, or cues, that suggest logically significant points or identifying markers for information source 110. Information source 110 may be any source of information, whether text-based, such as a web page, email message, output from a software application, document scanned by Optical Content Recognition (OCR) technology, or word-processing document, or non-text-based, such as a video, voicemail message, or audio clip. In the case of a non-text-based information source, information source 110 also may comprise a time-correlated textual representation, may first be converted to text by a speech-to-text engine, or may be analyzed without conversion to text using techniques known within the art. Information source 110 may be stored directly on computer system 100, on computer-readable media to which computer system 100 has access, or at a location on a network to which computer system 100 has access.

Information analysis component 170 may analyze any characteristics of information source 110 that suggest logically significant points or identifying markers, including typography, markup tags, formatting, syntax, semantics, prosodic information, and/or named entities. Analysis of information source 110 shall be described in greater detail hereafter.

In one embodiment, information analysis component 170 generates one or more skimmable representations of information source 110 in the form of location data 120, which identifies the locations of significant points within the information source, and may further be associated with metadata identifying the significance of the significant points. In one embodiment, information analysis component 170 generates one or more scrollable representations of information source 110 in the form of identifying markers 130, which are associated with locations in location data 120. Generating location data and identifying markers shall be described in greater detail hereafter.

In one embodiment, upon receiving input 155, a sequencing component 180 disposed within computer system 100 causes an aural presentation component 190 disposed within computer system 100 to deliver an aural presentation 140 of information source 110 according to a sequence based upon location data 120. In one embodiment, upon receiving input 155, a sequencing component 180 disposed within computer system 100 causes an aural presentation component 190 disposed within computer system 100 to deliver an aural presentation 140 of identifying markers 130 according to a sequence based upon location data 120.

Aural presentation 140 is a presentation of information that may be aurally assimilated. Aural presentation 140 may deliver excerpts from audio information in information source 110, text-to-speech presentations of segments of information source 110, or text-to-speech presentations of identifying markers 130.

Aural presentation component 190 may be any means capable of delivering an aural presentation 140, such as a speaker system coupled to computer system 100, an audio streaming engine, or an audio file generator capable of generating files to be aurally presented by another device.

Input 155 may be interactive user input as received from a keystroke, mouse movement, button press, voice command, or any other means for detecting user input. Input 155 may also be input generated by a computer or like device. Depending on the nature of computer system 100 and information source 110, input 155 may reflect a wide variety of commands, such as navigation input 150 and operational input 160 depicted in FIG. 1B and described hereafter.

Analysis of an Information Source

A wide variety of cues, or characteristics, that suggest context for the information contained in information source 110 may be analyzed to determine significant points for location data 120, as well as identifying markers 130. In one aspect, characteristics of the textual representation that are analyzed for both skimming and scrolling include one or more of typography, markup tags, formatting, syntax, semantics, and named entities, as well as other characteristics that suggest an underlying structure behind an information source. The specific characteristics analyzed vary, depending on the nature of the information source and objectives of the listener. Another aspect further relies on summarization techniques to derive identifying markers for scrolling.

In one embodiment, formatting and typography provide cues as to significant points in information source 110. For example, sentence and paragraph delimiters may provide cues for significant points. One set of significant points in an information source 110 may be identified by new paragraph symbols, while another set of significant points may be identified by sentence boundaries delimiters such as ., ;, ?, and !.

Figures 6A, 6B, 6C:
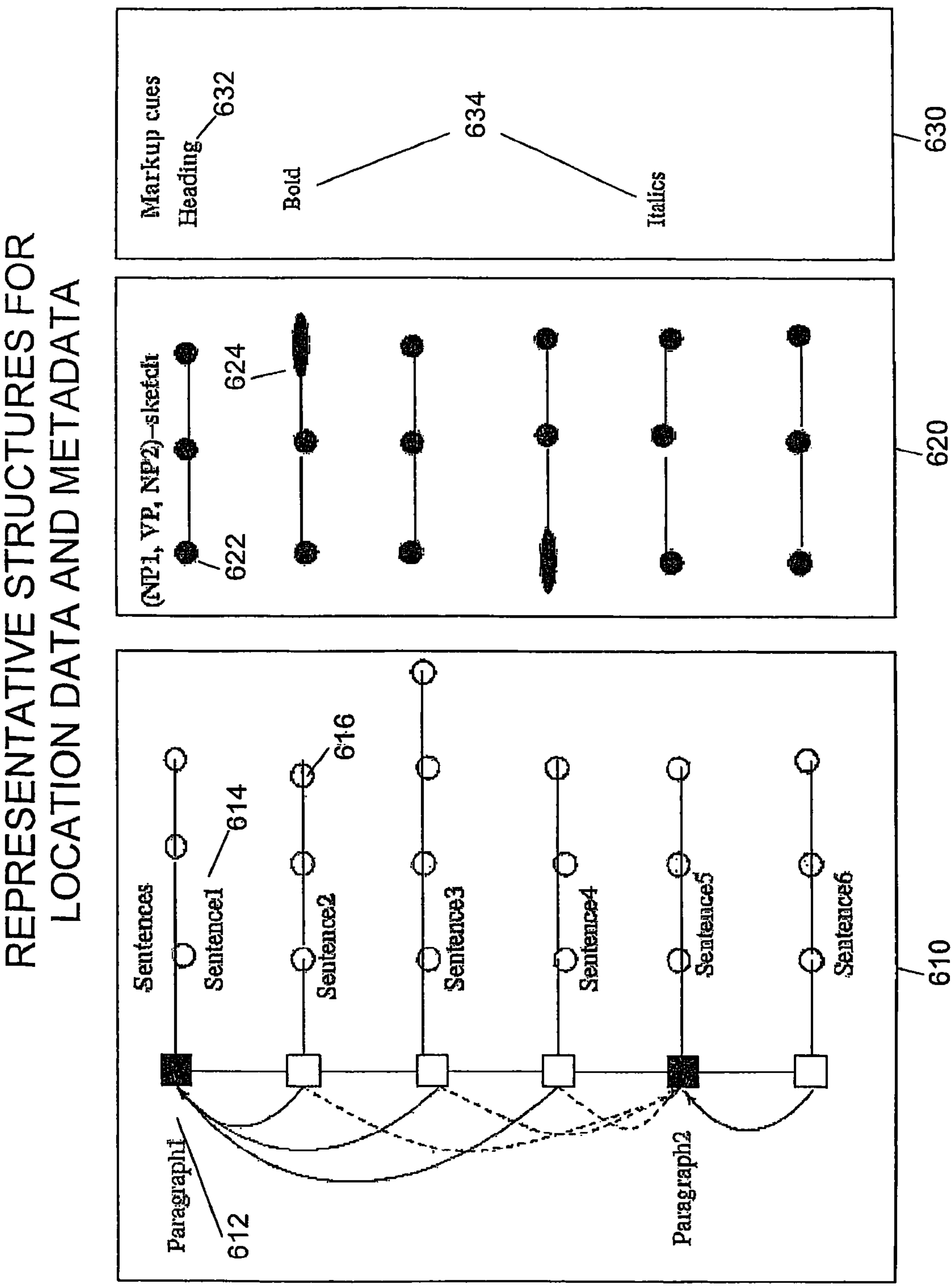
FIGS. 6A, 6B, and 6C illustrate example structures for storing location data and metadata, in accordance with an embodiment of the invention.

FIG. 6A depicts a structure 610 for representing location data that is derived from an analysis of paragraph and sentence delimiters. It comprises paragraph nodes 612 that are associated with paragraphs in an information source 110. Under each paragraph node 612 are sentence nodes 614 which are associated with sentences in an information source 110. Each sentence node 614 may be further broken down into words 616.

As another example, bolded, italicized, and underlined text, as well as other font variants, provide cues. They may, for instance, suggest significant points for headings and section divisions for information source 120. A word such as "warning" in a bold font may suggest a significant point at the start of its containing paragraph. It might also suggest an identifying marker 130 consisting of the word "warning" to be associated with the same location.

In one embodiment, markup tags, such as tags in a Hypertext Markup Language (HTML) document, provide cues as to significant points for location data 120. For example, in HTML, <p>, <br>, <table>, <ul> and <blockquote> tags might be used to identify significant points for paragraphs in location data 120, while <frame>, <hr>, <h1>, and <div> tags might be used to identify significant points for sections in location data 120. As another example, lower level tags such as <b>, <em>, <li>, <u>, and <span> may be used to identify significant points for location data 120.

Markup tags, such as tags in a Hypertext Markup Language (HTML) document, also may provide cues for generating identifying markers 130. Header tags such as <h1>, <h2>, and so on, may also provide identifying markers 130 that are associated with the locations of headers in information source 110. Lower level tags such as <b> or <a> might also suggest excerpts of the information source 110 suitable for use as identifying markers 130.

FIG. 6C illustrates a hierarchical structure 630 derived from an analysis of markup tags. A heading tag 632 has been used to determine a section node. Heading tag 632 may also be used as an identifying marker 130. Formatting tags 634 delimit lower-level nodes, and may also be used as identifying markers 130.

In one embodiment, semantic and syntactic features of an information source 110 provide cues as to the context of the information contained in information source 110. Any semantic or syntactic process may be used to control this analysis. One process involves Named Entity Recognition (NER), in which information source 110 is searched for named entities such as persons, places, or organizations. This process mirrors the tendency of a reader to search for distinctive and easy-to-spot entities in a document, as identified by names, numbers, and upper-case lettering. These named entities may be used as identifying markers 130, as shown in identifying marker set 132 of FIG. 1B. These named entities may also be used to identify significant points. For example, significant points may be formed for each sentence that contains a new named entity. A similar process might identify significant points or identifying markers based on quotations or citations.

Figure 1B:
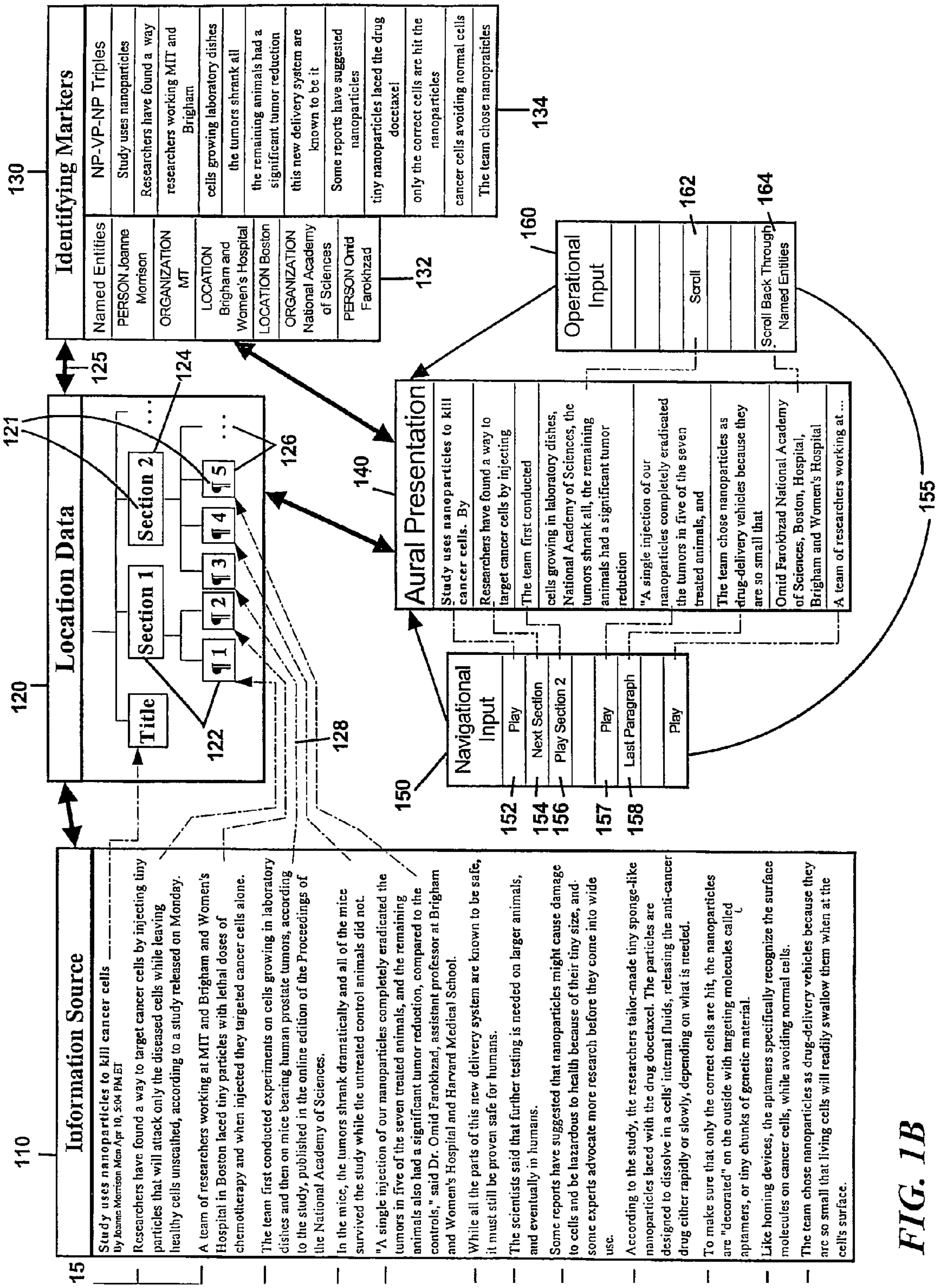
FIG. 1B is a block diagram depicting the operation of an embodiment of the invention.

Another process for semantic analysis involves first segmenting the text into sentences. Part of speech tagging is performed on each sentence, grammatically tagging the words according to their syntactic function (e.g. noun, verb, preposition, etc.). Shallow parsing is then performed on these words, resulting in phrases, which are likewise tagged according to their syntactic function (e.g. noun phrase, verb phrase, prepositional phrase, etc.). These phrases are grouped into triples. For each sentence, if such a triple exists, one triple consisting of, in order, a noun phrase, verb phrase, and second noun phrase (NP1, VP, NP2) is selected as an identifying marker 130. If more than one (NP1, VP, NP2) triple exists, typographic cues and NER are used to rank the triples and only the highest ranked triple is selected. Identifying marker set 134 of FIG. 1B illustrates a set of identifying markers 130 generated by such a semantic analysis.

FIG. 6B illustrates a structure for location data 120 based on such an analysis. Nodes 622 are normal phrases. Nodes 624 are named entities. It will be apparent that many other variants of this analysis may be used to generate location data 120 and identifying markers 130, including analyses that consider much more elaborate sequences of words and phrases.

In one embodiment, identifying markers 130 may be generated by summarization processes. For example, an information source 110 may be segmented into paragraphs. An identifying marker 130 may be generated for each paragraph using a summarization process.

Metadata

In one embodiment, metadata identifying the significance of a significant point is stored for each significant point represented by the locations in location data 120. The stored metadata for a significant point is associated with the location corresponding to the significant point in location data 120. This metadata is used to navigate between different sets of significant points in information source 110.

For example, in the case of significant points identified by sentence and paragraph boundaries, metadata may be created for each significant point indicating whether the significant point pertains to a new paragraph, new sentence, or both. Input 155 could navigate just the set of significant points for which there is metadata indicating a new sentence by commands such as "forward," moving aural presentation 140 to the next sentence and "reverse," moving aural presentation 140 to the previous sentence. Input 155 could likewise navigate just the set of significant points for which there is metadata indicating a new paragraph. By commands such as "fast forward," input 155 could move aural presentation 140 to the next paragraph, while input 155 indicating a "fast reverse" command would move aural presentation 140 to the previous paragraph, As another example, the HTML markup tags, <p>, <br>, <table>, <ul> and <blockquote> tags might be used to identify significant points for paragraphs, while <frame>, <hr>, <h1>, and <div> tags might be used to identify significant points for sections. Metadata is stored for each significant point indicating whether it is a section, paragraph, or both. In this case, navigational input such as "Next Section," and "Previous Section" might be used to move aural presentation 140 between different sections. As another example, different levels of significance are assigned in the metadata to significant points identified from <h1>, <h2>, <h3>, and <p> tags respectively. Markup cues might also be used in conjunction with cues from sentence delimiters to provide even more levels of significance 120.

In one embodiment, metadata are used to navigate to specific significant points within information source 110. For example, in an email message, fields such as "Subject" and "From" function as markup tags for the email message. These cues are used to define domain-specific metadata that may be more efficiently navigated using absolute commands such as "Play from Message Body" or "Replay Subject." Likewise, typography in the email message indicating quoted text, such as a > character, may be used to categorize portions of the email message differently in the metadata.

Figures 5A, 5B:
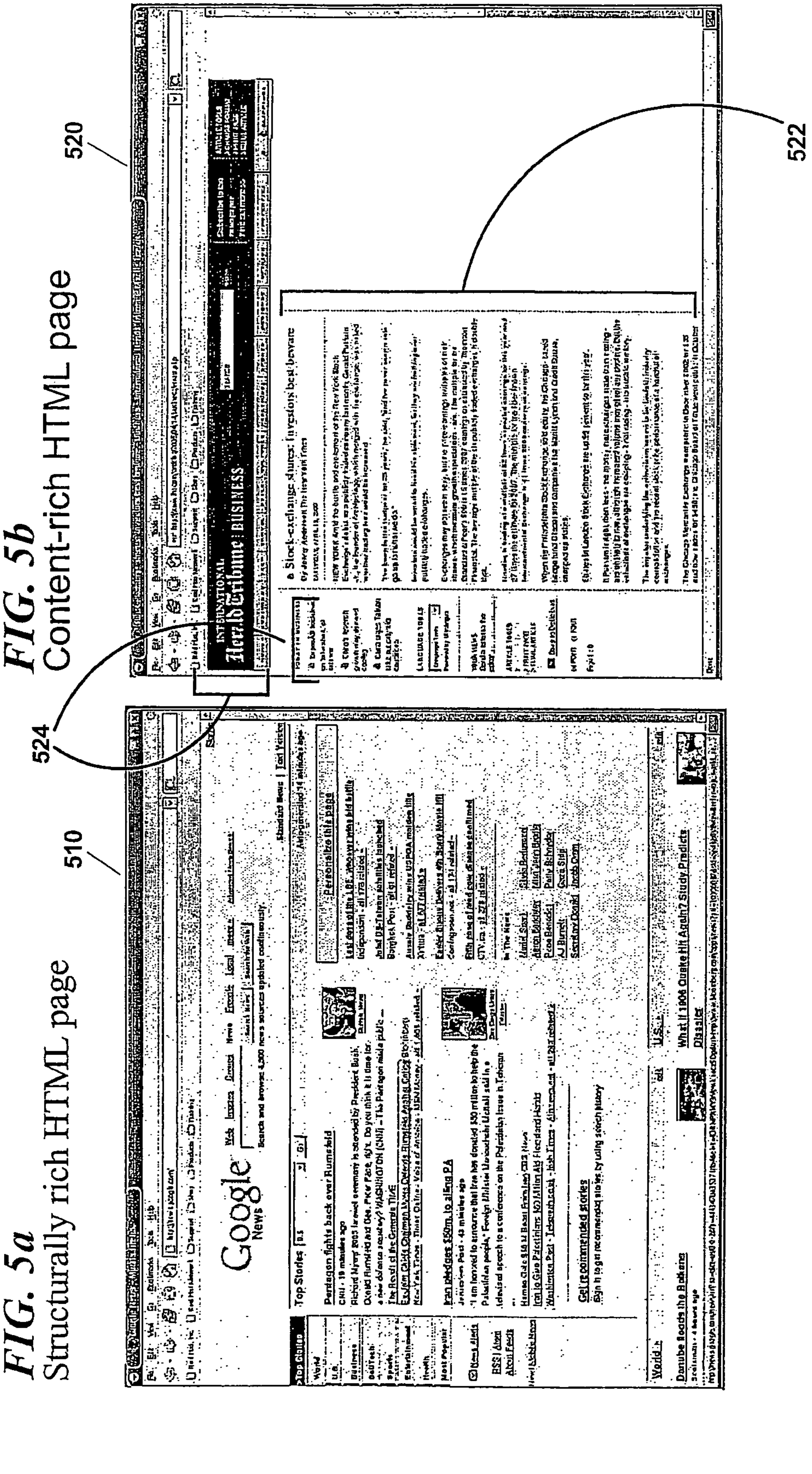
FIGS. 5A and 5B illustrate example information sources, in accordance with an embodiment of the invention.

FIGS. 5A and 5B depict example information sources, according to one embodiment of the present invention. Even when the markup tags do not explicitly define a more domain-specific structure, such as may be the case in structurally-rich or content-rich HTML pages, page segmentation analyses of the markup tags allow for a determination of more domain-specific metadata. As illustrated in the example information sources of FIGS. 5A and 5B, modern HTML pages are seldom simple. Rather, they are usually composite pages with rich layout structures. Depending on the content and layout of the page, a reader viewing a web page digests the information in the page differently. For example, when viewing a portal, a user may often jump directly to links or menus, whereas when viewing a news article, a user will generally ignore links and menus at first. A skimmable and scrollable aural presentation of a web page according to one embodiment takes these viewing habits into account.

A process for one such page segmentation analysis is as follows. Structurally rich HTML pages, such as page 510 in FIG. 5A, are mainly used for navigation. As such, most sections of the document are equally relevant to an aural presentation 140. On the other hand, content rich HTML pages, such as page 520 in FIG. 5B, have a lot of textual content to be synthesized. With these pages, the page may first be divided into segments using markup tags as explained above. Once a page is divided into segments, "text heavy" segments, such as segment 522, may be identified. Starting points for the segments may be identified as significant points in location data 120 and assigned a different significance in metadata than significant points based on "non-text-heavy" segments, such as segments 524. For example, metadata might designate the significant point at the start of segment 522 as a "Main Body" point, so that a user may navigate to it using absolute input 155 such as "Go to Main Body."

FIG. 1B is a block diagram depicting the operation of the invention according to one embodiment of the invention. The embodiment depicted may be implemented by any computer system, such as those depicted in FIGS. 1A, 4, and/or 8.

In one embodiment, location data 120 may be stored in internal data structures such as that depicted in FIG. 1B, wherein each node of the internal data structure represents segments of information source 120 formed by the identified significant points. The internal data structure may be a tree (as illustrated in FIG. 1B), a list, hierarchical, and/or any other data structure. The internal data structure may organize the nodes according to various levels of significance identified in the metadata. For example, information source 120 of FIG. 1B depicts an internal data structure with two levels. Section nodes 124 correspond to segments formed by segmenting information source 120 by significant points for which metadata 121 indicates a new section. Paragraph nodes 126 correspond to segments formed by segmenting information source 120 with significant points for which metadata 121 indicates a new paragraph.

Example Location Data

In one embodiment, location data 120 is created based on the analysis of information source 110. Although location data 120 is depicted as a tree, location data 120 may be any structure suitable for storing data. Location data 120 stores location information for significant points 115 in information source 110. Significant points 115 are identified through the previously mentioned analysis of the characteristics of information source 110. For example, as depicted in FIG. 1B, significant points 115 may be formed by a semantic analysis of logical divisions of thought in information source coupled with an analysis of paragraph divisions. There is a significant point 115 at the start of each paragraph of information source 110.

Locations 122 are stored for each significant point 115 in location data 120. Correspondence arrows 128 show how these locations 122 correlate with significant points 115. For example, the location 122 identified as "Title" correlates to the significant point at the title of information source 110, "Study uses nanoparticles to kill cancer cells." The location 122 identified as "Section 1" correlates to the first two paragraphs of information source 110. The location 122 identified as ¶1 correlates to the first paragraph of information source 110, while the location 122 identified as ¶2 correlates to the second paragraph.

Metadata 121 indicating a significance for each significant point may be associated with locations 122. For example, the location of a significant point for the fifth paragraph, which begins "A single injection," is associated with the metadata "¶5." As previously discussed, metadata 121 may be utilized by sequencing component 180 and input 155 for navigational purposes.

Metadata 121 may indicate more than one significance for a particular significant point 115. For example, the particular significant point 115 at the start of the third paragraph has metadata indicating two significances—first as "Section 2," and second as "¶3."

Example Identifying Markers

In one embodiment, identifying markers 130 are generated based on the analysis of characteristics of information source 110. Individual markers 130 may be direct excerpts of information source 110, such as names, headings, or sentence fragments, or they may be derived from summarization or categorization processes. For example, among the identifying markers 130 depicted in FIG. 1B is an identifying marker "the tumors shrank all," which is a combination of excerpts from the fourth paragraph of information source 110 selected by a semantic analysis. FIG. 1B also depicts an identifying marker "ORGANIZATION MIT," which is derived from a combined name and categorization analysis of the second paragraph of information source 110.

Identifying markers 130 may be divided into sets of identifying markers, wherein each identifying marker in a set is derived by an analysis of the same characteristics. For example, FIG. 1B contains two such sets—named entities 132 and semantic triples 134.

Each identifying marker 130 is associated 125 with a location 122 in location data 120 logically related to the segment of information source 110 from which the identifying marker 130 was derived. For example, the identifying marker 130 identified as "Researchers have found a way" is associated with a location 122 of location data 120 that correlates to the first paragraph of information source 110 (e.g., to ¶1 thereof). This first paragraph is the same paragraph from which this specific identifying marker was derived.

Sequencing

Referring again to FIG. 1A, in one embodiment, the sequencing component 180 determines a sequence for information source 110 based on a chronological ordering of information source 110.

In other embodiments, sequencing component 180 determines a non-chronological sequence. In these embodiments, the location data 120 is typically stored in a hierarchical structure, as outlined above. The hierarchical structure is arranged so that segments of the information source with a higher significance are represented first. For example, referring again to FIG. 5, the hierarchical structure is organized so that "text-heavy" segment 522 is synthesized first. Or the hierarchical structure may omit segments 524 altogether. Other factors besides "text-heaviness" may be considered in determining whether to assign greater weight to a segment in a hierarchical structure, including keywords or individual markers 130 within the segment, the fraction of non-anchor text, centeredness in the page, font size, and analyses of other types of cues within the segment.

Referring again to FIG. 1A, in one embodiment where aural presentation 140 involves aurally presenting identifying markers 130, sequencing component 180 may determine a sequence based on an alphabetical ordering of identifying markers 130.

The sequence determined by sequencing component 180 may also begin with a significant point other than the first significant point listed in location data 120. Aural presentation 140 and input 155 may both be considered in making such a determination. For example, if the aural presentation is at a current playback location, and input 155 indicates a "Next" command, sequencing component 180 may determine that the closest significant point chronologically forward of the current playback location should be the starting significant point for the sequence.

Navigating According to Location Data

Referring again to FIG. 1B, navigational input 150 is an input 155 that navigates between segments of information source 110 in aural presentation 140. Navigational input 150 may be interactive user input as received from a keystroke, mouse movement, button press, voice command, or any other means for detecting user input. Navigational input 150 may also be input generated by a computer or like device. Depending on the nature of computer system 100 and information source 110, navigational input 150 may reflect a wide variety of commands. FIG. 1B illustrates a subset of common commands, such as the "Play" command 152, and the "Next Section" command 154.

Navigational input 150 is used to select a location 122 associated with a particular significant point 115 at which aural presentation 140 should begin presenting information source 110. If the user or device generating navigational input 150 is cognitive of some or all of location data 120, navigational input 150 may specifically identify a location 122 to be aurally presented through absolute commands that identify metadata 121 unique to the particular location 122. For example, supposing information source 110 was an email message, and the user or device generating navigational input 150 was aware that metadata 121 reflecting the fields of the email message had been generated, navigational input 150 could select the location 122 corresponding to the significant point 115 for the subject field of the email message through a command such as "Play Subject." Or, as depicted in FIG. 1B, the user or device generating navigational input 150 might know that metadata 121 for a "Section 2" had been generated. Thus, navigation input 150 could be a "Play Section 2 " command 156, which would result in an aural presentation 140 ensuing with the significant point 115 corresponding to the location 122 for the "Section 2" metadata.

Alternatively, the user or device generating navigational input 150 may be entirely unaware of any location data 120. In this case, navigational input 150 may still select a location 122 through relative commands that take into account the current playback point of aural presentation 140. For example, "Play" command 152 selects the first location 122 in location data 120 because at the time it was issued, no segment of information source 110 was being presented.

A significant point 115 immediately preceding or following the current playback position of aural presentation 140 may serve as a point of reference for such a relative command. For example, as aural presentation 140 presents information from the title of information source 110, navigational input 150 indicating a "Next Section" command 154 is received. At the time of reception, the significant point 115 immediately preceding the current playback point of aural presentation 140 was the significant point 115 for the "Title" segment of information source 115. The "Next Section" command 154 selects the location 122 associated with the significant point 115 for "Section 1," since it is the next location 122 with metadata 121 indicating a section that follows the location 122 associated with the significant point 115 for the "Title."

As yet another example, "Last Paragraph" command 158 selects the last location 122 in location data 120 with metadata 121 indicating a paragraph of information source 110.

Navigating Based on Markers

Operational input 160 is an input 155 that initiates an aural presentation 140 of identifying markers 130. For example, as depicted in FIG. 1B, a "Scroll" command 162 initiates the following aural presentation of identifying markers: "cells growing in laboratory dishes, National Academy of Sciences, the tumors shrank all, the remaining animals had a significant tumor reduction."

Operational input 160 may be interactive user input as received from a keystroke, mouse movement, button press, voice command, or any other means for detecting user input. Operational input 160 may also be input generated by a computer or like device. Depending on the nature of the computer system 100 and the information source 110, operational input 160 may reflect a wide variety of commands. FIG. 1B illustrates just a small subset of common commands, such as "Scroll" command 162.

A common operational input 160 is "Scroll" command 162. "Scroll" command 162 results in the aural presentation of all identifying markers 130. The aural presentation may be sequenced according to the location data 120 with which the identifying markers 130 are associated, as previously explained. Another common operational input 160 is the "Scroll Back" command, of which command 164 is a variant. This command results in the backwards aural presentation 140 of identifying markers 130, sequenced according to the location data 120 with which the identifying markers 130 are associated.

A common variant of these two commands is a command which limits the aural presentation 140 of identifying markers 130 to one or more particular sets of identifying markers. For example, "Scroll Back through Named Entities" command 164 is a variant of the "Scroll Back" command which limits the aural presentation 140 of identifying markers 130 to named entities 132.

In one embodiment, operational input 160 is received during an aural presentation 140 of information source 110. Aural presentation 140 of identifying markers 130 is initiated with a marker corresponding to a location 122 logically related to the current playback point of information source 110. For example, as depicted in FIG. 1B, when scroll command 162 is received, the current playback location of aural presentation is "The team just conducted." The location 122 of location data 120 associated with this playback point is ¶3. This location 122 is associated with a number of identifying markers 130, the first of which being semantic triple "cells growing laboratory dishes." Thus, aural presentation 140 of identifying markers 130 begins with "cells growing laboratory dishes."

If operational input 160 is received during an aural presentation 140 of identifying markers 130, the aural presentation 140 of identifying markers 130 may begin with a marker corresponding to a location 122 that corresponds with the last or currently presented identified marker 130 in aural presentation 140.

Similarly, navigational input 150 received during the aural presentation 140 of identifying markers 130 may select a location 122 associated with the last or currently presented identifying marker. For example, "Play" command 157 is received during the presentation of the identifying marker 130 named "the remaining animals had a significant tumor reduction." This marker is associated with the location 122 for the paragraph that begins "A single injection of our." In response to "Play" command 157, the aural presentation 140 will begin with the significant point 115 for this paragraph.

Aural Presentation and Playback Modes

Aural presentation 140 is a presentation of information that may be aurally assimilated. Aural presentation 140 may be made by a speaker system associated with (e.g., coupled/connected to) a computer system. It may also be an audio stream or file capable of being aurally presented by another device. When a location in location data 120 is selected by navigational input 150 and the information source 110 already comprises audio information, aural presentation 140 simply rebroadcasts information source 110 beginning with the segment that corresponds to the selected node. Otherwise, when a location in location data 120 is selected by navigational input 150, aural presentation 140 uses a text-to-speech engine to present the textual representation of information source 110 beginning with the significant point that corresponds to the selected location. When operational input 160 is received, aural presentation 140 presents identifying markers 130, which may either be excerpts from audio information in information source 110, or text-to-speech presentations of identifying markers 130.

In one embodiment, different voice characteristics and playback speeds may be used for synthesizing different segments of information source 110 in aural presentation 140. For instance, different voice characteristics and playback speeds may be used for headers, body text, and hyper-links, as well as for scrolled information as opposed to regular information. These differing voice characteristics and playback speeds may be known as playback modes.

For example, a loud voice may be used for information corresponding to bolded text in the underlying textual representation. A voice quality such as timbre, tone, or pitch may change to indicate a hyperlink that can be navigated. The playback speed of the voice may change according to the semantic or syntactic significance of the information. Scrolled information may be played back at a different pitch than normal information.

According to one embodiment of the invention, the playback mode may be changed when the current playback point of aural presentation 140 matches a significant point for which metadata exists indicating a particular significance.

For example, the playback mode may be changed to a playback mode with a higher volume when a significant point with a significance of "bold" is encountered. The playback mode may return to normal when a significant point without such a significance is encountered.

According to one embodiment of the invention, a user may select the playback mode of the aural presentation of the information source. For example, the user may send input 155 indicating a playback mode with a higher speed.

According to one embodiment of the invention, a "skipped" playback mode may be used. For example, if a page segmentation analysis indicates that an information source 110 based on a web page has a navigational sidebar, it may be desirable to skip the sidebar altogether in aural presentation 140. Thus, location data 120 may have associated with it metadata indicating a lesser significance for the location corresponding to the significant point at the start of the navigational sidebar. When the current playback point matches the location corresponding to the significant point at the start of the navigational sidebar, the aural presentation may skip to a significant point that indicates greater importance (e.g. a significant point for the main frame of the web page), at which point normal playback mode would resume.

According to one embodiment of the invention, identifying markers 130 may also be presented according to different playback modes, using metadata associated with the locations from which the identifying markers 130 were derived. For example, an identifying marker 130 derived from a location whose metadata indicates a hyperlink might be presented in a different voice than other identifying markers.

According to one embodiment of the invention, a user may select the playback mode of the aural presentation of the identifying markers. For example, the user may send input 155 indicating a "Scroll Faster" command that results in a playback mode with a higher speed or wherein every other identifying marker is skipped.

Skimming Process Flow

Figure 2:
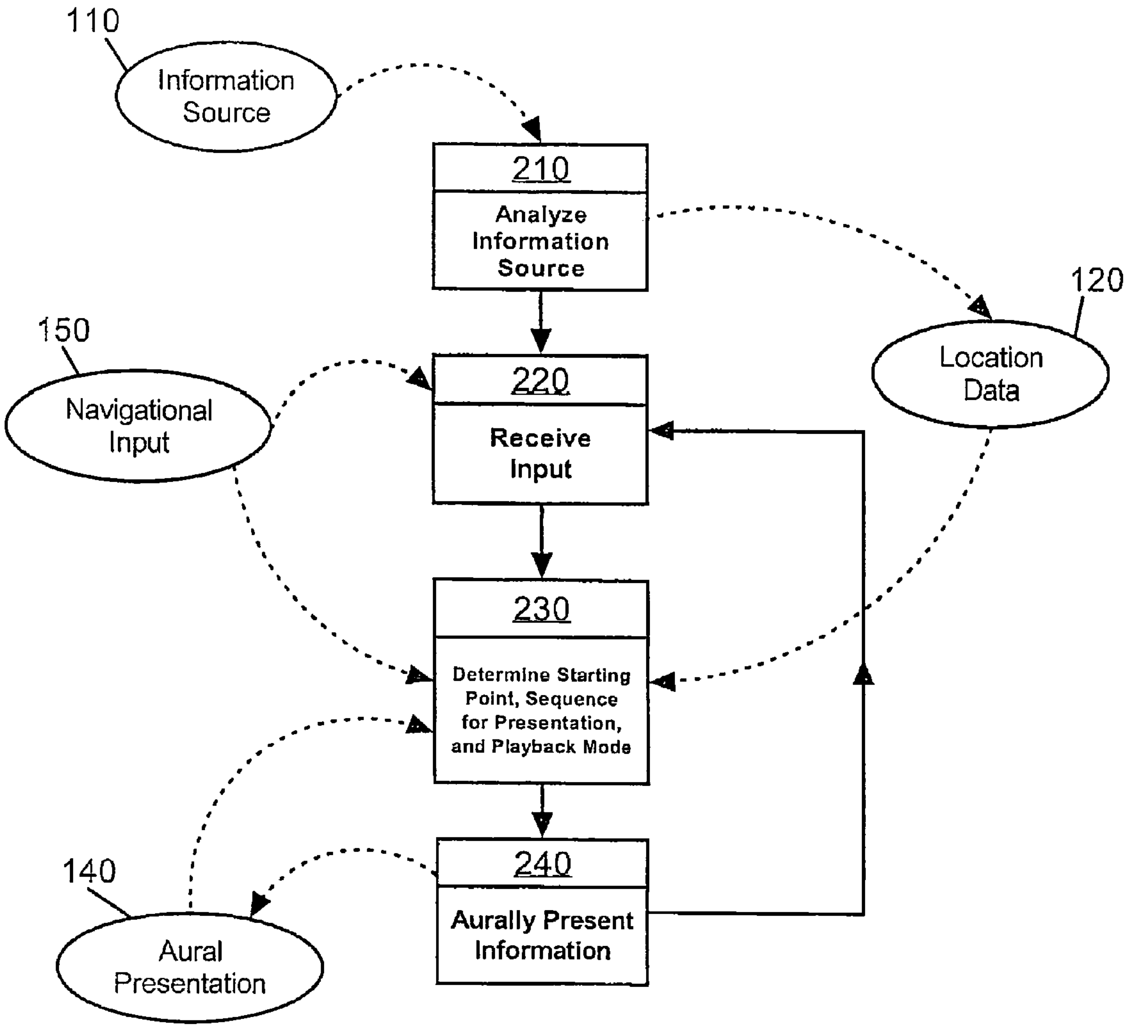
FIG. 2 is a flow diagram that illustrates a process for aurally skimming an information source, according to an embodiment of the invention.

FIG. 2 is a flow diagram that illustrates a process for aurally skimming an information source, according to an embodiment of the invention. At block 210, information source 110 is analyzed by an information analysis component so as to produce location data 120. The characteristics of information source 110 analyzed may include typography, markup tags, formatting, syntax, semantics, and named entities, as well as other characteristics known to suggest logically significant points of an information source 110.

At block 220, navigational input 150 is received by a sequencing component.

At block 230, a starting significant point of information source 110 is determined by a sequencing component, as well as a sequence for the playback of information source 110. In one embodiment of the invention, the sequencing component may further determine a playback mode. The determination may be based upon a number of factors, including navigational input 150, location data 120, metadata associated with location data 120, and the state of aural presentation 140.

For example, a simple case would be a determination based solely on navigational input 150 that indicates a "Play" command. In this case, the starting significant point would be determined to be the first significant point in the presentation, and the sequence for the presentation would mirror information source 110.

A somewhat more complex case, illustrated in FIG. 1B, is navigational input 150 that indicates a "Next Section" command 154. In this case, both the current state of aural presentation 140, which is presenting information from the title of information source 110, and location data 120, whose locations 122 and metadata 121 indicate the significant point 115 at which the next section begins, are important to the determination of the starting significant point, which is the paragraph that begins "Researchers have found a way to target cancer cells by injecting."

Other determinations may involve choosing a sequence for the presentation other than the chronological order of information source 110. Referring again to FIG. 2, the analysis of block 210 may have resulted in a hierarchical structure containing location data 120 whose nodes are ordered so as to highlight the most important part of the information source 110 first. For instance, if information source 110 is a web page, the hierarchical structure might indicate a sequence that begins with the main body of the web page as opposed to headers, menus, and advertisements.

At block 240, information source 110 is aurally presented by an aural presentation component, beginning with the starting segment and using the sequence determined in block 230. This results in aural presentation 140.

Blocks 220-240 may be repeated when, after the commencement of aural presentation 140, new navigational input 150 is received, returning the process flow to block 220.

Scrolling Process Flow

Figure 3:
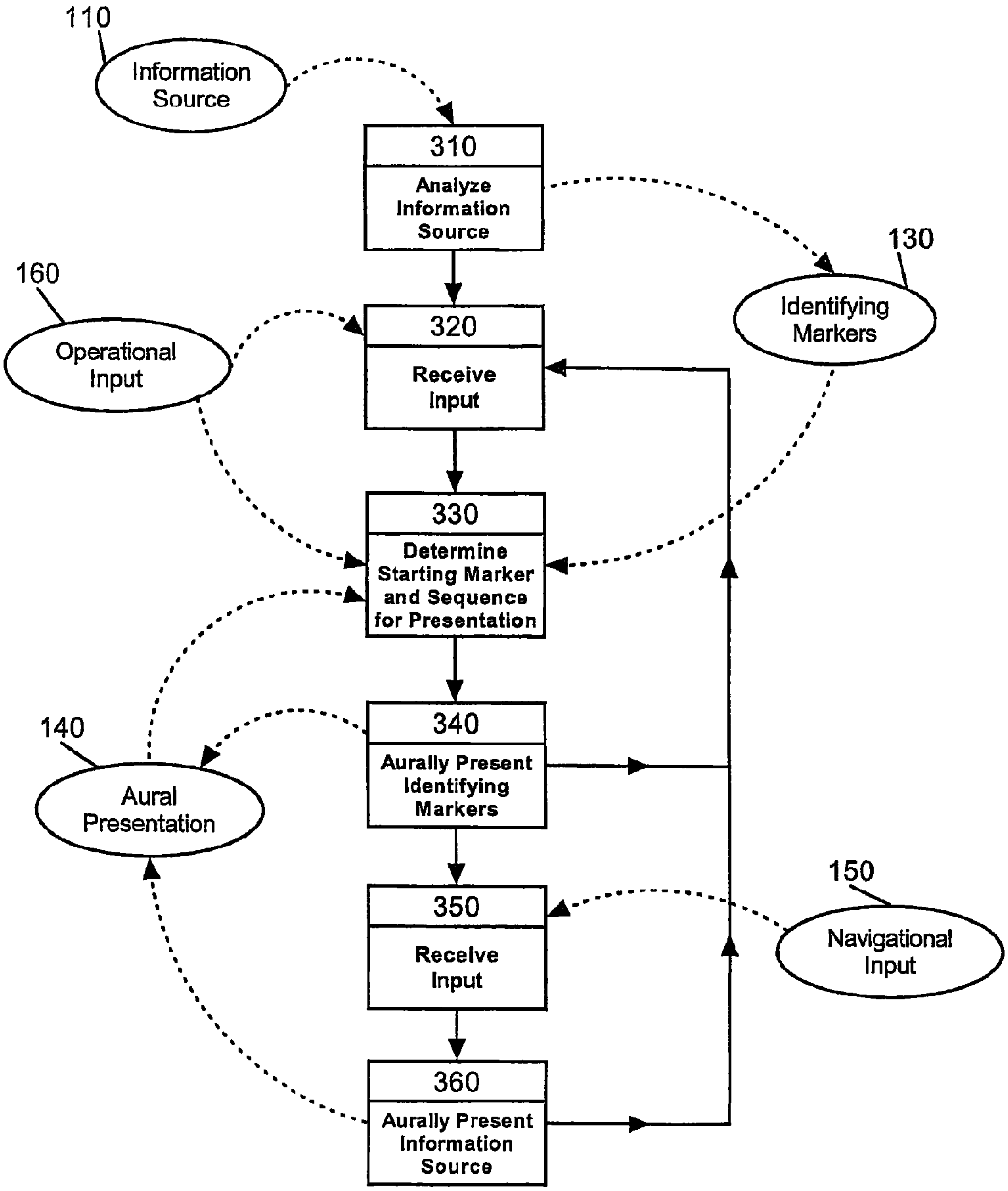
FIG. 3 is a flow diagram that illustrates a process for aurally scrolling an information source, according to an embodiment of the invention.

FIG. 3 is a flow diagram that illustrates a process for aurally scrolling an information source, according to an embodiment of the invention. At block 310, information source 110 is analyzed by an information analysis component so as to produce identifying markers 130. The characteristics of information source 110 analyzed may include typography, markup tags, formatting, syntax, semantics, and named entities, as well as other characteristics known to suggest a logical arrangement of an information source 110.

At block 320, operational input 160 is received by a sequencing component.

At block 330, a starting marker is determined, as well as a sequence for the playback of the identifying markers 130. The determination may be based upon a number of factors, including operational input 160, identifying markers 130, and the state of aural presentation 140.

For example, a simple case would be a determination based solely on operational input 160 that indicates a "Scroll" command. In this case, the starting segment would be determined to be the first segment in the presentation, and the sequence for the presentation would mirror information source 110.

A somewhat more complex case, illustrated in FIG. 1B, is operational input 160 that indicates a "Scroll" command 162. In this case, both the current state of aural presentation 140, which is presenting information from the paragraph of information source 110 that begins "The team first conducted," and identifying markers 130, which indicate the markers that correspond to that location in information source 110, are important to the determination of the starting marker, which is "cells growing in laboratory dishes."

Other determinations may involve choosing a sequence for a presentation of identifying markers 130 other than the chronological order of information source 110. Returning to FIG. 2, the analysis of block 310 may have resulted in multiple sets of identifying markers 130. Operational input 160 may indicate a sequence in which only one set of identifying markers are presented. Operational input 160 might also indicate other playback modes that result in different sequences. For instance, operational input 160 might indicate to play markers in reverse order, skip every other marker, or play only markers that are associated with a certain set of locations associated with particular metadata.

At block 340, information source 110 is aurally presented by an aural presentation component, beginning with the starting marker and using the sequence determined in block 330. This results in aural presentation 140.

Blocks 320-340 may be repeated when, after the commencement of aural presentation 140, new operational input 160 is received, returning the process flow to block 320.

At Block 350, navigational input 150 may be received. Upon reception of this navigational input, aural presentation 140 of identifying markers 130 stops.

At Block 360, information source 110 is aurally presented beginning with a location associated with the last presented identifying marker 130. This results in an aural presentation 140 of information source 110. In one embodiment of the invention, just as depicted in Block 330 of FIG. 2, a starting significant point, sequence, and playback mode may be determined for this aural presentation.

Blocks 320-360 may be repeated when, after the commencement of the aural presentation 140 of information source 110, new operational input 160 is received, returning the process flow to block 320.

Example Client-Server System

Figure 4:
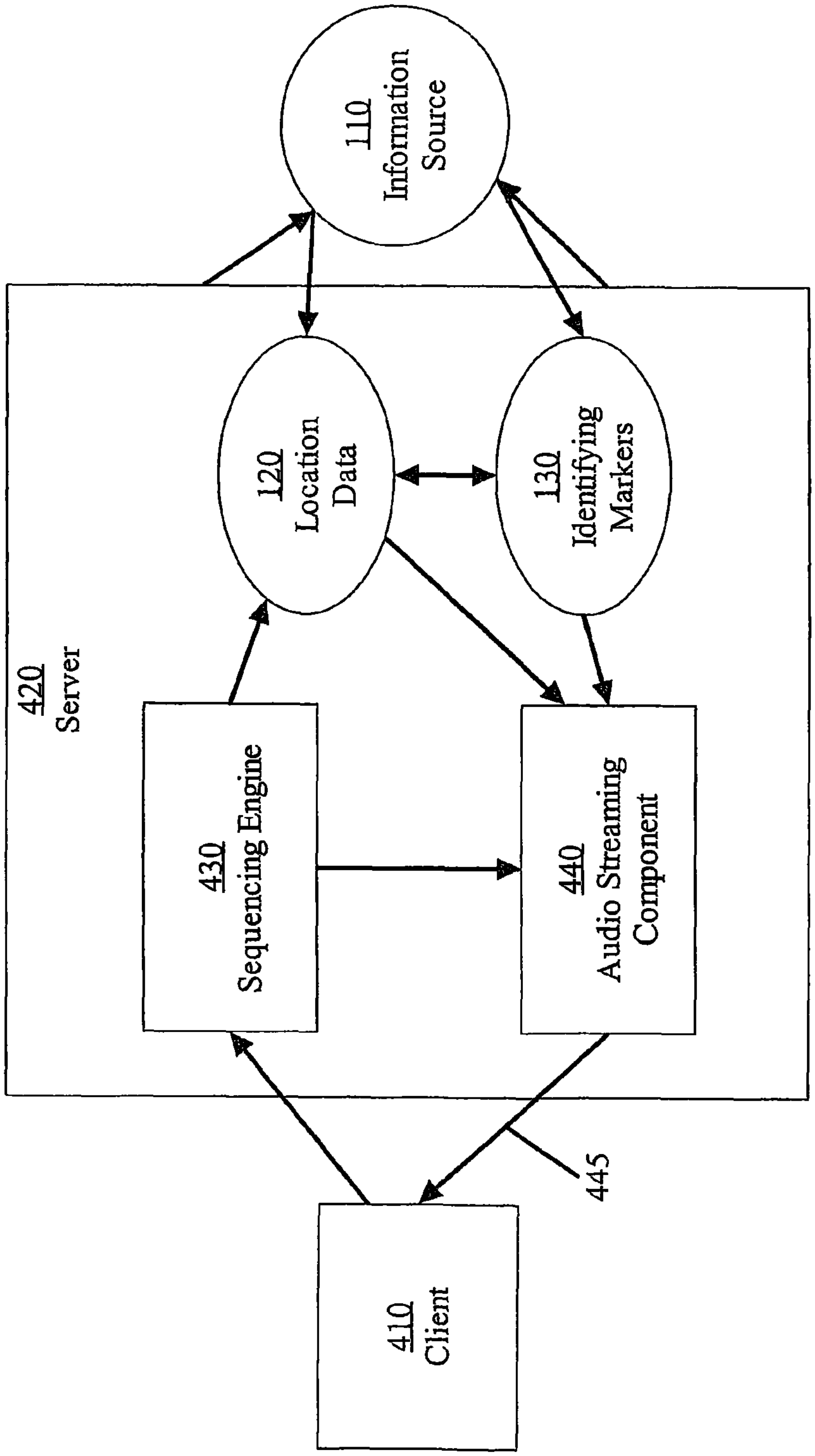
FIG. 4 is a block diagram of an example system in which an embodiment of the invention may be practiced.

FIG. 4 is a block diagram of an example system in which an embodiment of the invention may be practiced. The system is implemented as a client-server system 400, which allows for a thin client 410 by shifting the majority of the processing to a server 420.

Client 410 sends an information source 110, or instructions on how to locate an information source 110, to server 420. Information source 110 may be external of the server-client system. For instance, it may be a web page, in which case client 410 sends a URL to server 420, and the server uses the URL to access the web page. Information source 110 may also be stored on client 410, in which case client 410 sends the information source to server 420. Also, server 420 may itself store the information source to be synthesized, such as may be the case for email or voicemail, in which case client 410 instructs server 420 on which information source 110 to use.

Server 420 may maintain multiple skimmable representations of information source 110 in the form of location data 120 that stores locations associated significant points in information source 110. Upon receiving navigational input from client 410, a sequencing engine 430 coupled to server 420 instructs an audio streaming engine 440 to synthesize the information source according to a sequence based upon location data 120. Audio streaming engine 440 returns the results of this synthesis as an audio stream 445 to client 410. Client 410 plays the audio stream 445, resulting in aural presentation 140.

Sequencing engine 430 may also receive navigational input 150 from client 410 in the form of commands that cause sequencing engine 430 to instruct audio streaming engine 440 to halt its current audio stream 445 and resume synthesis with a new sequence starting at a location in location data 120 identified by the input. For examples, commands such as "forward," "reverse," "next," and "previous," may implicitly identify a location related to a currently presented segment of information source 110 or identify marker 130. Other commands may explicitly identify a location in location data 120. Navigational input 150 may also identify a specific set of location data 120 for producing output.

Server 420 also may maintain multiple scrollable representations of information source 110 in the form of identifying markers 130. These markers are associated with locations in location data 120. Upon receiving operational input 160, sequencing engine 430 instructs audio streaming engine 440 to synthesize information source 110 using the identifying markers 130 in a sequence based upon location data 120. Audio streaming engine 440 returns the results of this synthesis as audio stream 445 to client 410. Client 410 plays the audio stream 445, resulting in aural presentation 140.

Sequencing engine 430 may receive operational input 160 from client 410 in the form of commands that cause sequencing engine 430 to instruct audio streaming engine 440 to halt its current audio stream 445 and resume synthesis with a new sequence starting with an identifying marker 130 related to a currently presented segment of information source 110 or identifying marker 130. Operational input 160 may also identify a specific set of identifying markers 130 to present.

Audio streaming engine 440 may generate its audio stream 445 in any known manner for generating audio streams. For instance, it may use audio splicing or a text-to-speech engine. Audio streaming engine 440 may also employ a variety of playback modes involving different playback speeds, voice characteristics, and other synthesis options. These playback modes may be invoked by navigational input 150, operational input 160, or by sequencing engine 430 according to predefined rules for sequencing an information source 110.

Client 410 should stop playing audio stream 445 whenever it issues a command intended to halt the audio stream 445 and resume synthesis with a different information segment or marker. Audio stream 445 may still be in transit to client 410 when the command that halts audio stream 445 is issued. Accordingly, audio streaming engine 430 may deliver a "SYNC" command to client 410 prior to resuming synthesis. Client 410 may use the "SYNC" command to identify the resume point to resume playback of the audio stream 445. The "SYNC" command may be piggybacked on the audio stream 445. A pattern unlikely to occur in the audio stream may be used to represent the "SYNC" command. For example, the 32-bit pattern 00FF00FF may be used.

Inputs and Commands

Figure 7:
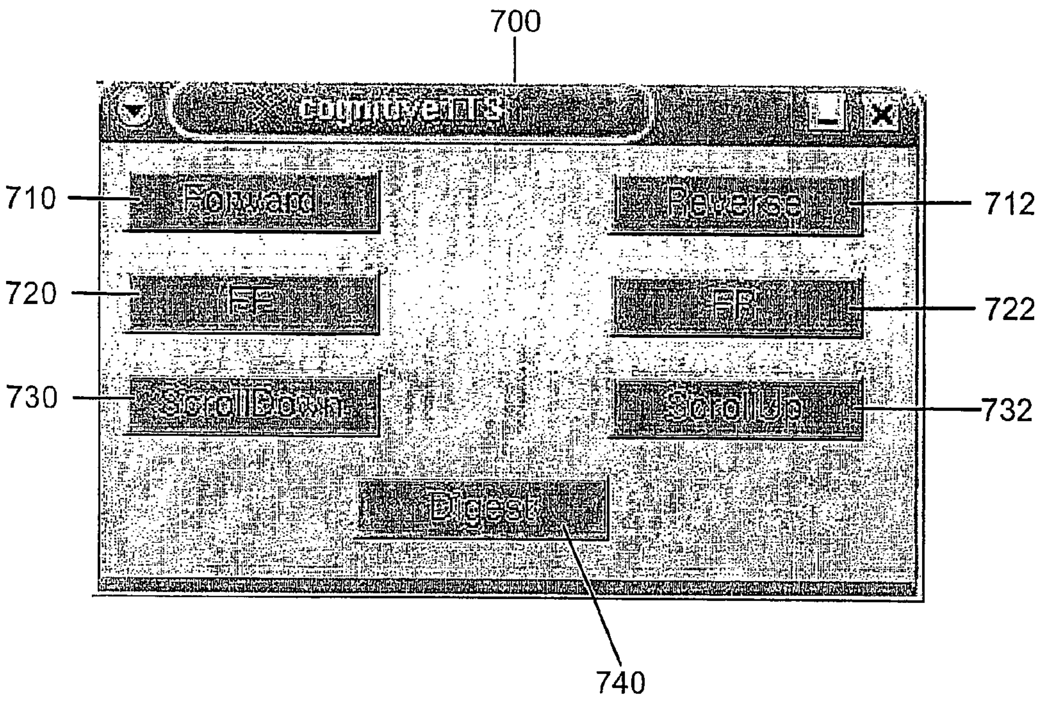
FIG. 7 illustrates an example user interface for generating input used to skim and scroll an aural presentation, in accordance with an embodiment of the invention.

FIG. 7 depicts an example user interface for generating input used to skim and scroll an aural presentation 140, in accordance with an embodiment of the invention. It is to be appreciated that the user interface depicted in FIG. 7 is for illustrative purposes only and is in no way meant to be construed as limiting. Embodiments of the present invention are well suited to use of other interfaces as well. Graphical user interface (GUI) 700 has a window displayed on a computer monitor screen. Many other interfaces may be used, such as keystrokes, mouse movements, voice commands, buttons, and other known user interfaces. Input may also be generated through interfaces without the involvement of a user, including programmatic interfaces.

GUI 700 contains a set of commands that may be used to skim and scroll an aural presentation 140. Forward command 710 moves aural presentation 140 forward a location in location data 120, such as to a location associated with a significant point for a new sentence. Reverse command 710 moves aural presentation 140 backwards a location in location data 120, such as to a location associated with a significant point for a previous sentence. FF command 720 moves aural presentation 140 forward to a location with metadata that indicates a higher level of significance, such as to a location associated with a significant point for a next paragraph. FR command 722 moves aural presentation 140 backwards to a location with metadata that indicates a higher level of significance, such as to a location associated with a significant point for a previous paragraph. ScrollDown command 730 scrolls aural presentation 140 by presenting identifying markers 130. ScrollUp command 732 scrolls aural presentation 140 by presenting identifying markers 130 in reverse order. Digest command 740 scrolls aural presentation 140 by presenting only identifying markers based on a summarization technique.

It will be apparent that many other commands for scrolling and skimming may also be used. For example, variations of the above commands may be used, such as a "Fast Scroll" that skips some identifying markers 130, a "Next Section" command that specifically selects a location with metadata indicating a new section, or a "Scroll Named Entities" command, which scrolls only a set of identifying markers 130. As another example, commands for selecting a specific location of an information source, such as "Play message body" or "Go to Subject," may be used.

As another example, "In," and "Out" commands may be used to navigate links in an information source. For example, an aural presentation may identify metadata for a location indicating hyperlink in an HTML-based information source by using a different voice. In response, an "In" command may be issued, which would start a new aural presentation 140 based on the linked information source. An "Out" command could then be used to return to an aural presentation 140 of the original HTML-based information source.

Hardware Overview

Figure 8:
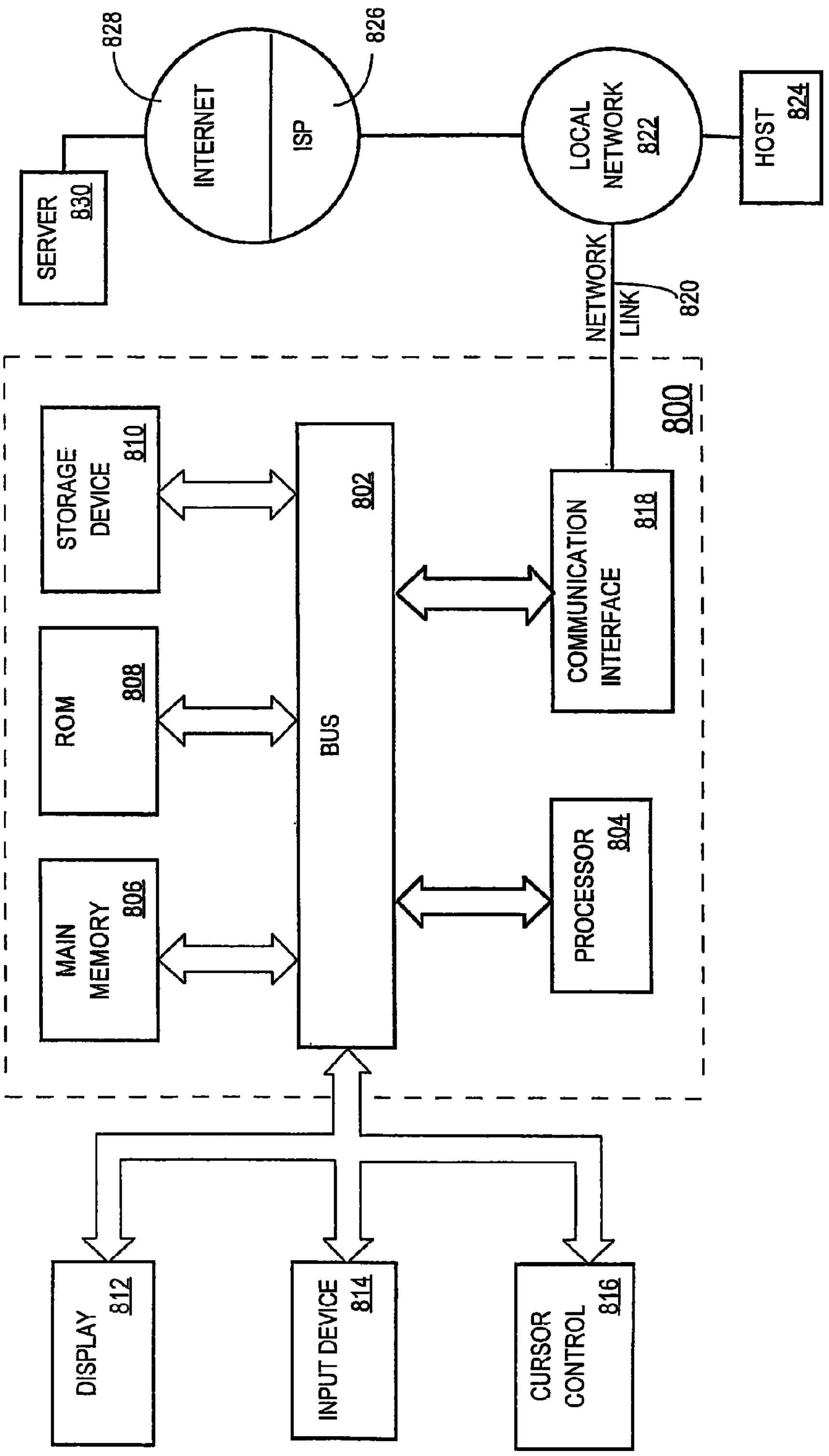
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other legacy physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Equivalents, Extensions, Alternatives And Miscellaneous

Aural skimming and scrolling is thus described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for aurally scrolling an information source, comprising:

analyzing an information source;

wherein the information source comprises a plurality of markup tags;

wherein analyzing the information source comprises using the plurality of markup tags to identify a plurality of segments of the information source from which to derive corresponding marker texts;

generating and storing, separate from the information source, a set of a plurality of marker texts based at least on the analyzing of the information source including generating each marker text in the set of marker texts based at least on an analysis of a corresponding segment, of the plurality of identified segments, of the information source;

wherein the analysis of a particular segment, of the plurality of identified segments, corresponding to a particular marker text of the set of marker texts comprises applying a summarization technique to the particular segment to derive the particular marker text;

wherein the analysis of the particular segment comprises determining a significance of the particular segment based at least in part on a relative amount of text content of the particular segment;

generating and storing data that comprises, for each marker text in the set of marker texts, an association between the marker text and a location within the information source, the location corresponding to the segment of the information source that corresponds to the marker text;

arranging the plurality of marker texts in a sequence, the particular marker text having an order in the sequence;

wherein the order of the particular marker text in the sequence is dependent on the determined significance of the particular segment that was determined based at least in part on the relative amount of text content of the particular segment;

initiating an aural presentation of the sequence, the aural presentation comprising computerized text-to-speech synthesis of at least a portion of the sequence;

during the aural presentation of the sequence, receiving input while the particular marker text of the set of marker texts is being aurally presented; and in response to the input:

ceasing the aural presentation of the particular marker text;

inspecting the data to identify the location associated with the particular marker text; and initiating an aural presentation of the information source at the location associated with the particular marker text, the aural presentation comprising computerized text-to-speech synthesis of at least a portion of the information source;

wherein the method is performed by one or more computing devices.

2. The computer-implemented method as recited in claim 1, wherein the sequence corresponds to the chronological order of the associated locations within the information source.

3. The computer-implemented method as recited in claim 1, wherein the sequence corresponds to the sequential order of the associated locations within the information source.

4. The computer-implemented method as recited in claim 1, further comprising:

aurally presenting at least a portion of the information source;

wherein the sequence begins with a marker text of the set of marker texts associated with the location of a current playback point in the aural presentation.

5. The computer-implemented method as recited in claim 1, wherein the sequence corresponds to an order associated with the set of marker texts.

6. The computer-implemented method as recited in claim 1, wherein the sequence reflects a perceived significance of each marker text of the plurality of marker texts.

7. The computer-implemented method as recited in claim 1, wherein the set of marker texts comprises a first set of marker texts and a second set of marker texts, the method further comprising:

storing metadata that indicates that the first set of marker texts have a first logical significance and that the at least second set of marker texts have at least a second logical significance.

8. The computer-implemented method as recited in claim 7, wherein the plurality of marker texts comprises one or more marker texts belonging to the first set of marker texts.

9. The computer-implemented method as recited in claim 1, wherein the input comprises at least one of an aural input and a text based input.

10. The computer-implemented method as recited in claim 1, wherein the input comprises at least one of a speech based input and a tactile input.

11. The computer-implemented method as recited in claim 10, wherein the tactile input is received from an interface comprising at least one of a keyboard, a mouse, a joystick, a touchpad, a sensor bearing glove, a speech input interface, and a button.

12. The computer-implemented method as recited in claim 1, wherein the information source comprises a text-based information source.

13. The computer-implemented method as recited in claim 1, wherein the information source comprises at least one of:

an electronic mail message;

output of a messaging client;

a voicemail message;

a document produced by an optical content recognition application;

an electronic document;

textual output of a software application;

an audio stream with accompanying transcription; and a video stream with accompanying transcription.

14. The computer-implemented method as recited in claim 1, wherein, prior to the analyzing step, the information source is converted into representative text.

15. The computer-implemented method as recited in claim 1, wherein the particular marker text comprises an excerpt of the information source identified based on at least one of:

a font characteristic of the information source that changes near the location associated with the particular marker text;

a typographic characteristic of the information source that changes near the location associated with the particular marker text;

a semantic significance of the information source identified near the location associated with the particular marker text;

a syntactic significance of the information source identified near the location associated with the particular marker text;

a named entity of the information source identified near the location associated with the particular marker text; and a markup tag of the information source identified near the location associated with the particular marker text.

16. The computer-implemented method as recited in claim 1, wherein the particular marker text is generated from an analysis of a segment of the information source at the location associated with the particular marker text, wherein the analysis comprises at least one of summarization, categorization, shallow parsing, grammar tagging, semantic tagging, and named entity recognition.

17. One or more non-transitory computer-readable media storing instructions which, when executed by one or more computing devices, cause performance of a computer-implemented method for aurally scrolling an information source comprising the steps of:

analyzing an information source;

wherein the information source comprises a plurality of markup tags;

wherein analyzing the information source comprises using the plurality of markup tags to identify a plurality of segments of the information source from which to derive corresponding marker texts;

generating and storing, separate from the information source, a set of a plurality of marker texts based at least on the analyzing of the information source including generating each marker text in the set of marker texts based at least on an analysis of a corresponding segment, of the plurality of identified segments, of the information source;

wherein the analysis of a particular segment, of the plurality of identified segments, corresponding to a particular marker text of the set of marker texts comprises applying a summarization technique to the particular segment to derive the particular marker text;

wherein the analysis of the particular segment comprises determining a significance of the particular segment based at least in part on a relative amount of text content of the particular segment;

generating and storing data that comprises, for each marker text in the set of marker texts, an association between the marker text and a location within the information source, the location corresponding to the segment of the information source that corresponds to the marker text;

arranging the plurality of marker texts in a sequence, the particular marker text having an order in the sequence;

wherein the order of the particular marker text in the sequence is dependent on the determined significance of the particular segment that was determined based at least in part on the relative amount of text content of the particular segment;

initiating an aural presentation of the sequence, the aural presentation comprising computerized text-to-speech synthesis of at least a portion of the sequence;

during the aural presentation of the sequence, receiving input while the particular marker text of the set of marker texts is being aurally presented; and in response to the input:

ceasing the aural presentation of the particular marker text;

inspecting the data to identify the location associated with the particular marker text; and initiating an aural presentation of the information source at the location associated with the particular marker text, the aural presentation comprising computerized text-to-speech synthesis of at least a portion of the information source.

18. The one or more non-transitory computer-readable media as recited in claim 17, wherein the sequence corresponds to the chronological order of the associated locations within the information source.

19. The one or more non-transitory computer-readable media as recited in claim 17, wherein the sequence corresponds to the sequential order of the associated locations within the information source.

20. The one or more non-transitory computer-readable media as recited in claim 17, the method further comprising:

aurally presenting at least a portion of the information source;

wherein the sequence begins with a marker text of the set of marker texts associated with the location of a current playback point in the aural presentation.

21. The one or more non-transitory computer-readable media as recited in claim 17, wherein the sequence corresponds to an order associated with the set of marker texts.

22. The one or more non-transitory computer-readable media as recited in claim 17, wherein the sequence reflects a perceived significance of each marker text of the plurality of marker texts.

23. The one or more non-transitory computer-readable media as recited in claim 17, wherein the set of marker texts comprises a first set of marker texts and a second set of marker texts, the method further comprising:

storing metadata that indicates that the first set of marker texts have a first logical significance and that the at least second set of marker texts have at least a second logical significance.

24. The one or more non-transitory computer-readable media as recited in claim 23, wherein the plurality of marker texts comprises one or more marker texts belonging to the first set of marker texts.

25. The one or more non-transitory computer-readable media as recited in claim 17, wherein the input comprises at least one of an aural input and a text based input.

26. The one or more non-transitory computer-readable media as recited in claim 17, wherein the input comprises at least one of a speech based input and a tactile input.

27. The one or more non-transitory computer-readable media as recited in claim 26, wherein the tactile input is received from an interface comprising at least one of a keyboard, a mouse, a joystick, a touchpad, a sensor bearing glove, a speech input interface, and a button.

28. The one or more non-transitory computer-readable media as recited in claim 17 wherein the information source comprises a text-based information source.

29. The one or more non-transitory computer-readable media as recited in claim 17, wherein the information source comprises at least one of:

an electronic mail message;
output of a messaging client;
a voicemail message;
a document produced by an optical content recognition application;
an electronic document;
textual output of a software application;
an audio stream with accompanying transcription; and
a video stream with accompanying transcription.

30. The one or more non-transitory computer-readable media as recited in claim 17, wherein, prior to the analyzing step, the information source is converted into representative text.

31. The one or more non-transitory computer-readable media as recited in claim 17, wherein the particular marker text comprises an excerpt of the information source identified based on at least one of:

a font characteristic of the information source that changes near the location associated with the particular marker text;
a typographic characteristic of the information source that changes near the location associated with the particular marker text;
a semantic significance of the information source identified near the location associated with the particular marker text;
a syntactic significance of the information source identified near the location associated with the particular marker text;
a named entity of the information source identified near the location associated with the particular marker text; and
a markup tag of the information source identified near the location associated with the particular marker text.

32. The one or more non-transitory computer-readable media as recited in claim 17, wherein the particular marker text is generated from an analysis of a segment of the information source at the location associated with the particular marker text, wherein the analysis comprises at least one of summarization, categorization, shallow parsing, grammar tagging, semantic tagging, and named entity recognition.

* * * * *

UNITED STATES PATENT AND TRADEMARK OFFICE

CERTIFICATE OF CORRECTION

PATENT NO. : 9,087,507 B2
APPLICATION NO. : 11/600346
DATED : July 21, 2015
INVENTOR(S) : Srinivasan H. Sengamedu It is certified that error appears in the above-identified patent and that said Letters Patent is hereby corrected as shown below:

Title page, item (75) Delete “Karnataka” and insert --Bangalore--.

Signed and Sealed this
Twenty-fourth Day of November, 2015

Michelle K. Lee

Michelle K. Lee
*Director of the United States Patent and Trademark Office*